(12) United States Patent
Lucy et al.

(10) Patent No.: US 6,759,943 B2
(45) Date of Patent: Jul. 6, 2004

(54) AUTO SETTING OF MEMORY PREFERENCE SETTINGS FROM REMOTE VEHICLE ENTRY DEVICE

(75) Inventors: Scott Lucy, Lake Orion, MI (US); James A. Poirier, Sterling Heights, MI (US); Frank Buccinna, Livonia, MI (US); Gerald Ostrander, Davison, MI (US); Joseph R. Thompson, Jr., Rochester Hills, MI (US)

(73) Assignee: Siemens VDO Automotive Corporation, Auburn Hills, MI (US)

(*) Notice: Subject to any disclaimer, the term of this patent is extended or adjusted under 35 U.S.C. 154(b) by 497 days.

(21) Appl. No.: 09/796,134

(22) Filed: Feb. 28, 2001

(65) Prior Publication Data

US 2002/0118579 A1 Aug. 29, 2002

Related U.S. Application Data

(60) Provisional application No. 60/203,781, filed on May 12, 2000.

(51) Int. Cl.[7] .............................................. G05B 19/04
(52) U.S. Cl. ................ 340/5.72; 340/5.64; 340/426.13; 307/10.1; 701/49
(58) Field of Search ............................... 340/5.72, 5.61, 340/5.62, 5.64, 426.13, 426.14, 426.16, 426.17, 825.25, 825.69, 825.72; 307/10.1, 10.4; 701/1, 49; 180/287; 365/200

(56) References Cited

U.S. PATENT DOCUMENTS 4,244,242 A    1/1981  Uno
4,451,887 A  * 5/1984  Harada et al. ................ 701/49
4,754,255 A  * 6/1988  Sanders et al. ............ 307/10.4
5,525,977 A  * 6/1996  Suman .................. 340/825.25
5,808,374 A    9/1998  Miller et al.

FOREIGN PATENT DOCUMENTS

| DE | 3609688 A1 | 9/1986 |
| EP | 0505336 A1 | 9/1992 |
| FR | 2696384 A1 | 4/1994 |
| JP | 61-21842 A | 1/1986 |

OTHER PUBLICATIONS

International Search Report, dated Oct. 24, 2001.

* cited by examiner

*Primary Examiner*—Edwin C. Holloway, III

(57) ABSTRACT

A remote memory preference system for a passenger vehicle is disclosed. The remote memory preference system utilizes existing passive or active remote entry devices. Memory preference settings include driver's seat position, mirror positions and radio station presets. Once these settings are adjusted by a primary vehicle user, they are stored in a memory location in the vehicle either automatically or when a memory button on the remote entry device is depressed by the user. Settings may then be later recalled either automatically by activating the remote entry device or when a recall button on the remote entry device is depressed by the user. The system may also employ a shift register system, which would automatically store current and previous memory preference settings.

10 Claims, 3 Drawing Sheets

AUTO SETTING OF MEMORY PREFERENCE SETTINGS FROM REMOTE VEHICLE ENTRY DEVICE

This application claims priority to U.S. Provisional Application No. 60/203,781 filed on May 12, 2000.

BACKGROUND OF THE INVENTION

This invention relates to a remote memory preference system for a passenger vehicle for adjusting user preferences such as seat position, mirror positions and radio presets and which ties a memory set of preferences to a user ID code. The remote memory preference system is incorporated into existing passive or active remote entry devices. Essentially, the features of storing and then moving the components to the memory position is as known. This invention relates to the way the memory positions are set and stored.

Many modern passenger vehicles are equipped with a convenience feature commonly referred to as "memory seat" in which a user may store and then later recall desired seat adjustment settings. Typically there are two numbered storage buttons, "1" and "2", which correspond to the number of positions that may be stored in memory and recalled. There is also a third memory or "M" button, which activates the memory storage feature. Thus a user would adjust the seat to a desired position and press the "M" button to activate memory storage followed by the "1" or "2" button to fix the desired settings. To recall the desired settings the user presses the relevant numbered storage button that was activated during the user's original storage of settings. The memory seat concept has been expanded to include the storage of other convenience settings such as rear view and side view mirror positions as well as radio station presets. Such an expanded system will hereinafter be referred to as a memory preference system.

One disadvantage of the memory preference systems currently in use is that the number of settings that may be stored and therefore the number of users that may store their settings is limited to the number of storage buttons provided. Typically, vehicles have a keypad with only two numbered storage buttons indicating that only two users can store their settings.

A related disadvantage is that each storage button must have a pair of wires leading to and from it, and the storage buttons must be mounted in an accessible location. Memory preference systems currently in use that are able to store two different settings typically have three buttons, the two numbered storage buttons and the memory button which activates memory storage. Positioning the three button keypad presents a challenge in that it must be accessible to the user yet not be so prominent as to detract from the styling of the vehicle thus rendering it aesthetically unpleasing.

Further, routing the wires to and from the keypad buttons also becomes an obstacle in vehicles having many electronic options. The sheer size and weight of the complex wiring systems within such vehicles has become a drawback.

The use of remote entry devices for vehicles is known. Typically, the remote entry devices are provided with a coded number for recognition by the vehicle prior to the vehicle allowing the holder of the remote entry access to certain security functions. This coded number is typically unique to the particular remote entry device, and will also provide unique signals for each of the two or more remote entry devices held by the several possible typical users of a vehicle. As an example, should a husband and wife each typically use a vehicle, the remote entry devices would still have unique signals. It would be desirable to incorporate memory preference functions with the remote entry system thus eliminating any complications that occur as a result of a complex wiring configuration. In addition, the incorporation of memory preference functions with the remote entry system nullifies accessibility requirements of the memory preference functions which would be provided in a hand held remote device.

It would further be desirable to provide a remote memory preference system that is able to accommodate more than two preferred configurations as well as temporary configurations.

SUMMARY OF THE INVENTION

In a disclosed embodiment of this invention a remote memory preference system is incorporated with a remote entry device for a vehicle. The remote entry device may utilize a passive or an active system. Passive devices communicate with the vehicle automatically, usually through an inductive couple. Active devices communicate with the vehicle only when indicated to do so by the user by way of activating a button or switch on the device. The remote entry device employs a complex and often encrypted electronic identification system to prevent unauthorized access to the vehicle. In this invention, the electronic identification system of the remote entry device is tied to the memory preference system. As a user approaches the vehicle and enters the range where positive identification can occur, the memory preference settings for the user are automatically recalled and activated. The number of users whose different settings could be stored is limited only by how many remote transmitters are recognized by the system and on the amount of memory reserved for storing convenience settings.

One way to implement the incorporated system is to have the vehicle temporarily "remember" the identification and memory preference data whenever it is either passively or actively electronically received. This identifying data would remain in temporary memory until the vehicle is started and then later when the vehicle is turned of for a set period of time such as thirty seconds. Upon expiration of the set time period, the vehicle would electronically store the users memory preference data along with the users identification data. The next time that users identification data is received by the vehicle, the memory preference settings for that particular user would be automatically recalled. In this embodiment, no extra button or switch for memory preference recall are required in the vehicle. The authorized user would not allow others to use his or her remote entry device while using the vehicle.

For example, in the instance where a father, the primary user, allows his daughter the use of the car, he would simply provide the ignition and door lock keys without the remote entry device. The daughter could set the convenience settings to her liking during use of the car. The father's stored settings would be automatically recalled, however, once he operates the remote entry device. Of course, a second remote entry device may also be provided for the daughter which would enable her own electronic identification with respect to the vehicle as well as recall of her own preferences settings.

An alternative to automatically storing a users identification and memory preference data upon the expiration of a set time period is to incorporate a memory button system on the remote entry device. To store preference settings for the primary user, a memory storage button is depressed within a set period of time. An alternate user may then temporarily re-adjust the preference settings. A memory recall button may then be depressed by the primary user to override the temporary settings and return to the stored preference settings. The use of the memory button system may involve depressing more than one button to initiate storage or recall. That is, it may not be necessary to have a separate memory button, but rather utilize some combination of actuations of the existing buttons (door lock/unlock) in a particular order may be utilized to actuate the memory function.

In another alternative embodiment, the memory preference settings could be automatically stored for each users identifying data every time the engine is shut off. These stored settings would be entered in a shift register, such that earlier stored settings remain in the memory. A memory button system is incorporated into the remote entry device. Upon depressing a memory recall button, the shift register would be queried. Each setting entry would be compared against the other, and a match of five out of eight, for example, would be considered to be the most likely valid settings for that particular identification data and thus would be the settings that are recalled. This embodiment could be beneficial in such situations as where the alternative user is a parking valet.

A variation of this embodiment would be to use a shift register in conjunction with a permanent register. Any time there are five consecutive matching memory preference settings, for example, for a particular identification data in the shift register, those settings would be permanently stored in a memory location. The desired settings in this memory location would then be recalled whenever the recall function was commanded by the identified user.

These and other features of the present invention can be understood from the following specification and drawings, the following of which is a brief description.

DETAILED DESCRIPTION OF THE DRAWINGS

Figure 1:
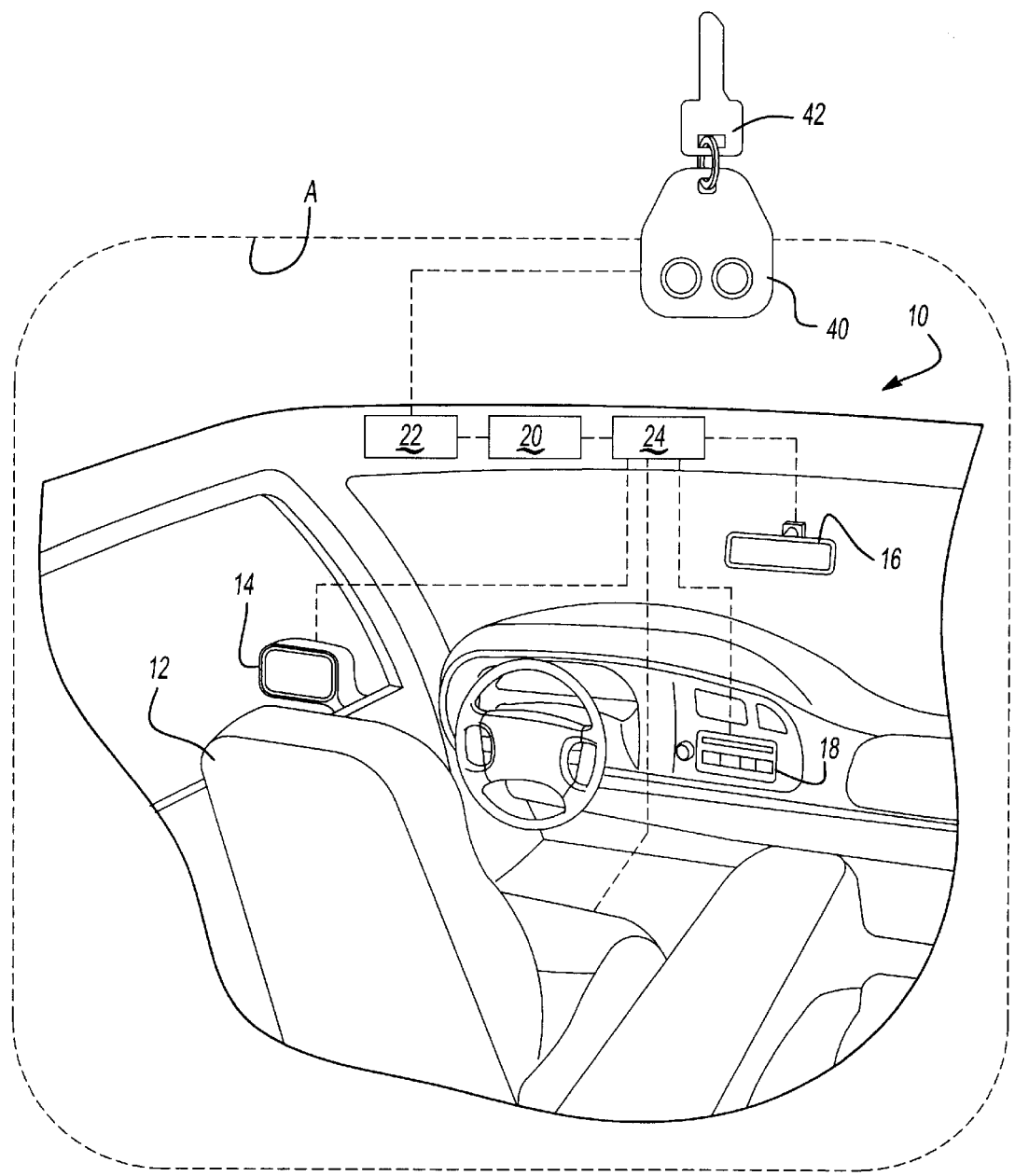
FIG. 1 schematically shows an embodiment of the memory preference setting system of the present invention.

As shown schematically in FIG. 1, the basic elements of the memory preference setting system of the present invention include vehicle 10 and remote entry device 40, which may attach to a vehicle key 42. Some elements of vehicle 10 may be adjusted so that they allow optimum comfort and convenience to the vehicle user. These elements include the drivers seat position 12, vehicle side and rear view mirrors 14 and 16 positions respectively, and radio station presets on radio 18. Once adjusted to the desired position by a user, a memory preference setting has been established for that particular user. The memory preference setting is then automatically stored in a memory location 20 in the vehicle 10 for subsequent recall. Further, the memory preference setting is associated with the users identification data which allows authorized vehicle entry by way of remote entry device 40.

Remote entry device 40 may operate as a passive or active device as known. Typically, a passive device is not associated with a mechanical key 42. Once remote entry device 40 is in the range denoted by A where identifying data from remote entry device 40 may be electronically received by electronic data receiving device 22 in vehicle 10, the memory location 20 is activated and the identified users memory preference setting is thus recalled. This memory preference setting data is then conveyed to a controller 24 which, in turn, adjusts the vehicle elements accordingly.

With this invention, rather than needing to actively set a memory position, when the user has initially left the vehicle, the positions of each of the components subject to memory preference are stored in the memory 20 and associated with the particular code from the remote entry device that had initially gained access into the vehicle. Thus, when the holder of that remote entry device first utilizes the vehicle and sets the positions, they will be thereafter remembered as that particular user's desired memory positions. In such a system, should the holder of the remote device 40 wish to allow another user to use the vehicle without changing the memory position, that other user could be provided with the mechanical key 42 only. Thus, the memory positions will not be changed when this other user has exited the vehicle after resetting the positions. Instead, the components will stay in that readjusted position set by the other user until the remote entry device 40 is again utilized to actuate the vehicle security systems. At that time, all of the components will be returned to he prestored memory positions.

Figure 2:
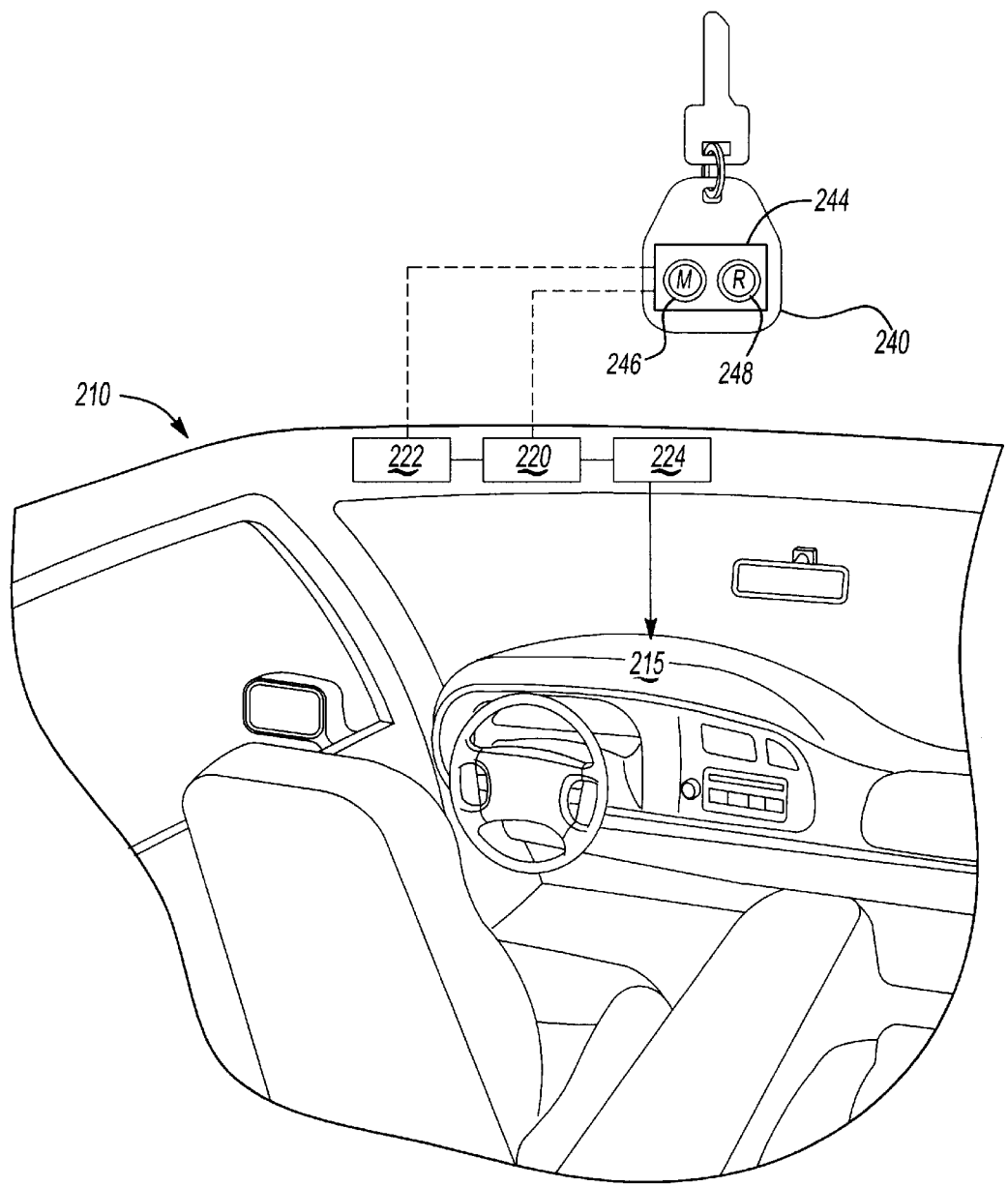
FIG. 2 schematically shows the memory preference system of the present invention incorporating the use of a memory button system.

In FIG. 2, remote entry device 240 incorporates a memory button system 244. In this embodiment, a users memory preference setting is not automatically stored and recalled. Rather, the primary user depresses memory storage button 246 in order to store the settings in the memory location 220 of vehicle 210. The remote entry device 240 conveys identifying data to data receiving device 222 to allow entry to the vehicle as known. Thus, an alternative user may remotely gain entry to the vehicle and manually adjust the elements 215 to his or her liking. When the primary user is then ready to operate the vehicle 210, memory recall button 248 is depressed in order to recall the original preference setting. This memory preference data is then conveyed to controller 224 which, in turn, adjusts the vehicle elements 215 accordingly.

Figure 3:
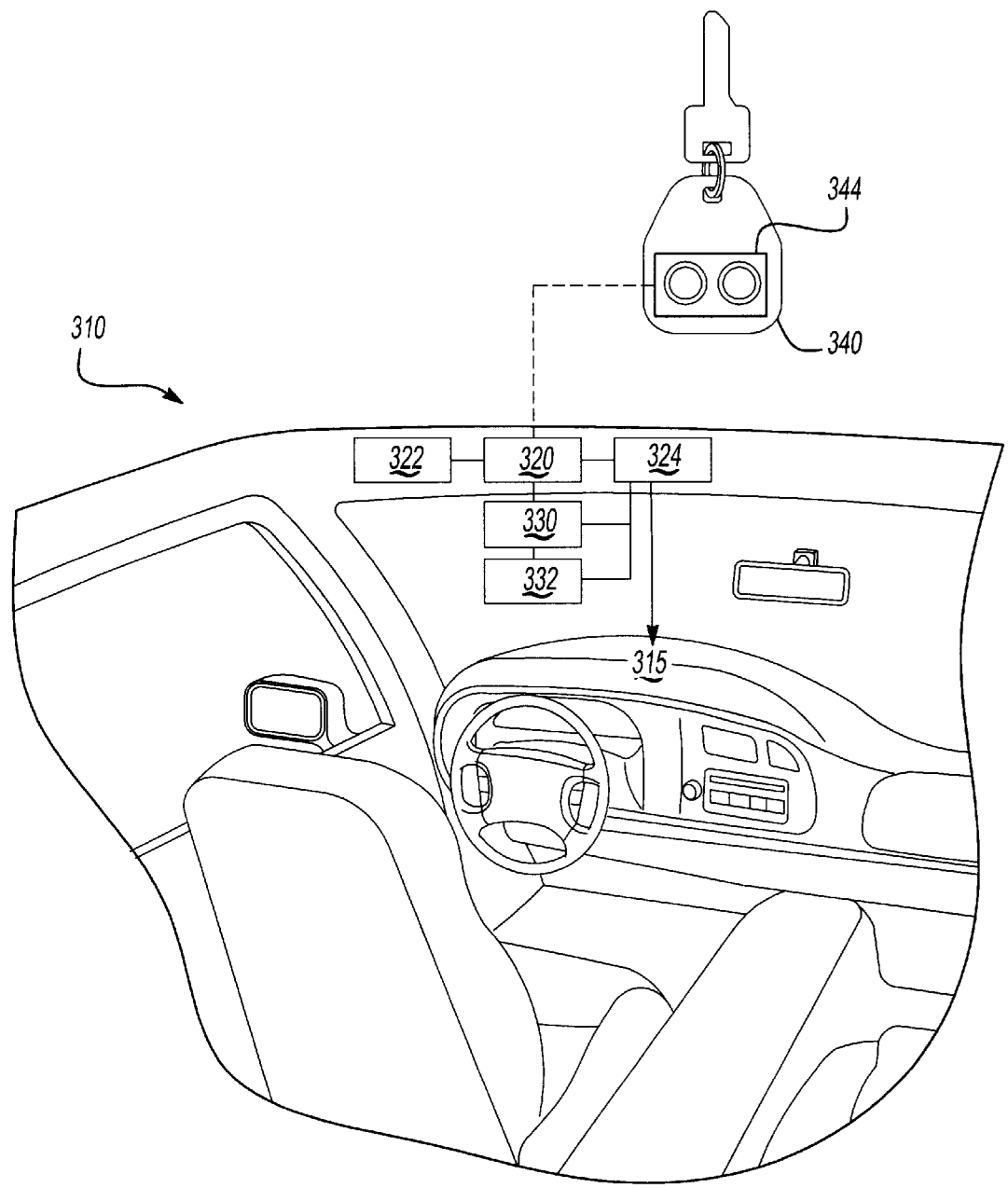
FIG. 3 schematically shows the memory preference system of the present invention further incorporating a register mechanism.

In FIG. 3, a register 330 is incorporated into memory portion 320 of vehicle 310. In this embodiment, the memory preference settings of elements 315 could be automatically stored in memory portion 320 for each user having an authorized remote entry device 340 for the vehicle 310 every time the engine is shut off. A particular users identifying data would be received by electronic data receiving element 322 and associated with that particular users memory preference setting. The automatically stored settings are entered in a shift register 330 such that earlier stored settings remain in the memory. Upon depressing memory recall button 344, shift register 330 would be queried. Of course, this recall of the previous settings could happen passively without the necessity of actuating any recall button. Each setting entry is compared against the others, and a match of a predetermined number of settings would be considered the most likely setting for that particular identifying data and thus recalled. This memory preference data is then conveyed to controller 324 which, in turn, adjusts the vehicle elements 315 accordingly. Such an embodiment is useful in the event that the vehicle is operated by a parking valet.

A permanent register 332 may be used in conjunction with shift register 330. Anytime there are a predetermined number of consecutive matching memory preference settings for a particular identification data in shift register 330, these settings would be permanently stored in the permanent register 332. The desired settings in the permanent register 332 would then be recalled whenever the user initiated the recall function by way of memory recall button 344.

A preferred embodiment of this invention has been disclosed, however, a worker in this art would recognize that certain modifications would come within the scope of this invention. For that reason, the following claims should be studied to determine the true scope and content of this invention.

What is claimed is:

1. A memory preference system for a vehicle whereby a vehicle use's preferred settings may be electronically recalled, wherein:
    said vehicle houses a memory storage location, an electronic data receiving device, and a controller;
    said vehicle enabling entry authorization by way of a user carried remote entry device that conveys identifying data to said electronic data receiving device;
    said memory preference system being incorporated into said user carried remote entry device such that a vehicle stores said preferred settings at said memory storage location, and said memory storage location being activated for recall when a vehicle controller identifies said identifying data from said remote entry device and associates it with a particular user, said particular user being associated with the stored set of said preferred settings, said memory storage location then conveys said preferred settings to said controller which enables the stored preferred settings; and
    stored preferred settings are automatically entered in a shift register such that previously stored settings remain in said memory storage location and when said memory storage location is later activated for recall, said shift register is queried to determine a match to a predetermined number of preferred settings in order to establish the most likely preferred setting for a current vehicle user.

2. A memory preference system for a vehicle as recited in claim 1 wherein said preferred settings are stored in said memory storage location and associated with a set of identifying data utilized to gain access to a vehicle each time the vehicle is turned off.

3. A memory preference system as recited in claim 1 wherein a permanent register is provided with said shift register so that a predetermined number of consecutive matching preferred settings for a vehicle user would be permanently stored in said permanent register for subsequent recall by said vehicle user.

4. A memory preference system as recited in claim 1 wherein said remote entry device is provided with user operated memory and recall buttons so that said preferred settings are stored in said memory location when said memory button is depressed and said preferred settings are recalled when said recall button is depressed.

5. A memory preference system for a vehicle whereby vehicle user's preferred settings may be electronically set and later electronically recalled, wherein;
    said vehicle houses a memory storage location, an electronic data receiving device, and a controller;
    said vehicle enabling entry authorization by way of a user carried remote entry device that conveys identifying data to said electronic data receiving device; said memory preference system being incorporated into said user carried remote entry device such that a vehicle stores said preferred settings at said memory storage location, and said memory storage location being activated for recall when a vehicle controller identifies said identifying data from said remote entry device and associates it with a particular user, said particular user being associated with the stored set of said preferred settings, said memory storage location then conveys said preferred settings to said controller which enables the stored preferred settings;
    said remote entry device is provided with user operated memory and recall buttons so that said preferred settings are stored in said memory location when said memory button is depressed and said preferred settings are recalled when said recall button is depressed; and
    stored preferred settings are automatically entered in a shift register such that any previously stored settings remain in said memory storage location and when said memory storage location is later activated for recall, said shift register is queried to determine a match to a predetermined number of preferred settings in order to establish the most likely preferred setting for a current vehicle user.

6. A memory preference system as recited in claim 5 wherein a permanent register is provided with said shift register so that a predetermined number of consecutive matching preferred settings for a vehicle user would be permanently stored in said permanent register for subsequent recall by said vehicle user.

7. A memory preference system for a vehicle whereby a vehicle user's preferred settings may be electronically set and later electronically recalled, wherein:
    said vehicle houses a memory storage location, an electronic data receiving device, and a controller;
    said vehicle enabling entry authorization by way of a user carried remote entry device that conveys identifying data to said electronic data receiving device;
    said memory preference system being incorporated into said user carried remote entry device such that a vehicle stores said preferred settings at said memory storage location;
    said preferred settings being electronically associated with said identifying data such that at the time when said identifying data is received by said electronic data receiving device from said remote entry device, said memory storage location is automatically activated for recall of preferred settings which are then conveyed to said controller which enables the preferred settings; and
    said stored preferred settings are automatically entered in a shift register such that previously stored settings remain in said memory storage location and when said memory storage location is later activated for recall, said shift register is queried to determine a match to a predetermined number of preferred settings in order to establish the most likely preferred setting for a current vehicle user.

8. A memory preference system as recited in claim 7 wherein a permanent register is provided with said shift register so that a predetermined number of consecutive matching preferred settings for a vehicle user would be permanently stored in said permanent register for subsequent recall by said vehicle user.

9. A memory preference system for a vehicle whereby a vehicle user's preferred settings may be electronically set and later electronically recalled, wherein:
    said vehicle houses a memory storage location, an electronic data receiving device, and a controller;
    said vehicle enabling entry authorization by way of a user carried remote entry device that conveys identifying data to said electronic data receiving device;

said remote entry device is provided with user operated memory and recall buttons;

said memory preference system being incorporated into said user carried remote entry device such that a vehicle stores said preferred settings at said memory storage location upon depression of said memory button and then depression of said recall button to recall said preferred settings which are then conveyed to said controller which enables the preferred settings; and said stored preferred settings are automatically entered in a shift register such that previously stored settings remain in said memory storage location and when said memory storage location is later activated for recall, said shift register is queried to determine a match to a predetermined number of preferred settings in order to establish the most likely preferred setting for a current vehicle user.

10. A memory preference system as recited in claim 9 wherein a permanent register is provided with said shift register so that a predetermined number of consecutive matching preferred settings for a vehicle user would be permanently stored in said permanent register for subsequent recall by said vehicle user.

* * * * *